United States Patent [19]
Arena

[11] Patent Number: 6,034,728
[45] Date of Patent: Mar. 7, 2000

[54] SNAPSHOT ADAPTER FOR VIDEO CAMERAS

[76] Inventor: Luigi Arena, 162 Sheridan Ave., Mt Vernon, N.Y. 10552

[21] Appl. No.: 08/774,590

[22] Filed: Dec. 30, 1996

[51] Int. Cl.$^7$ .................................................. H04N 5/225
[52] U.S. Cl. .......................... 348/372; 348/376; 348/220
[58] Field of Search ................................. 348/220, 239, 348/372–376; H04N 5/225

[56] References Cited

U.S. PATENT DOCUMENTS

| | | | |
|---|---|---|---|
| 4,837,817 | 6/1989 | Maemori | 348/333 |
| 5,173,779 | 12/1992 | Lee | 358/213.26 |
| 5,475,441 | 12/1995 | Parulski et al. | 348/552 |

FOREIGN PATENT DOCUMENTS

| | | | |
|---|---|---|---|
| 62-086914 | 4/1987 | Japan . | |
| 63-073843 | 3/1988 | Japan . | |
| 63-117572 | 5/1988 | Japan | 5/225 |
| 63-173469 | 7/1988 | Japan | 5/225 |
| 1-268266 | 10/1989 | Japan | 5/225 |
| 02322029 | 11/1990 | Japan . | |
| 03103874 | 4/1991 | Japan . | |
| 3-247175 | 11/1991 | Japan | 5/225 |

*Primary Examiner*—Wendy Garber
*Assistant Examiner*—Jacqueline Wilson
*Attorney, Agent, or Firm*—Lackenbach Siegel Marzullo Aronson & Greenspan, P.C.

[57] ABSTRACT

A device that adds freeze-frame capability to camcorders or video cameras so that they can be used as a digital snapshot cameras. The freeze-frame adapter is designed as an add-on module which connects to the battery receptacle of the video camera or camcorder. The snapshot module contains both the freeze-frame electronics and the battery and replaces the battery of the camcorder. The battery provides power to both the camcorder and the photo adapter module. No modifications of the camcorder are required. The video signal used as the source of images for the freeze-frame adapter is derived from the Audio-Video output of the camcorder. The unit is always on and ready for use whenever the camcorder is on. Still images can be acquired simultaneously to video. The viewfinder of the camcorder also operates as the viewfinder in the snap-shot mode. The image is captured by pressing a shutter button on the freeze-frame adapter. Images can be acquired while the camcorder is filming. Both motion and still images can be acquired simultaneously. Captured images can be downloaded into an image processing system, such as a computer via a standard serial or parallel port.

11 Claims, 2 Drawing Sheets

SNAPSHOT ADAPTER FOR VIDEO CAMERAS

BACKGROUND—FIELD OF INVENTION

This invention relates to digital photography and video cameras, specifically to a device which adds freeze-frame capability to the camcorder or video camera to which it is connected thus allowing use of the camcorder as a digital camera.

DESCRIPTION OF THE RELATED PRIOR ART

Digital cameras have recently been introduced as a practical and relatively inexpensive way to import images into computers. They generate images by digitizing the output of optoelectronic transducers and temporarily storing the images in on-board memory. The images are downloaded via serial or parallel ports or other data transfer link. The quality of images produced by digital camera is generally inferior to that of optical scanners which have usually higher resolution and more accurate color rendering. Digital cameras, however, are of more practical use especially because of their portability. The cost of digital cameras ranges from few hundred to several thousand dollars and is in great part determined by the quality of the opto-electronic transducers. The resolution, the image size, the number of colors reproduced varies with the quality of the camera.

A second way to import images into computers is to connect a video camera to a frame grabbing device connected to a computer. The frame grabbing device can be internal or external and utilizes software running on the computer to acquire and store images. These devices are designed to work in conjunction with a computer and are generally not suitable for portable use.

More recently, digital camcorders with freeze frame capability have been introduced. They are a camcorder and a digital camera in a single unit and allow both cine and still images to be acquired. Digital camcorders are usually high-end products and still not widely used because of their cost. They are a good choice for first time buyers who can afford a more expensive camcorder but would hardly justify the cost for most people who already own a camcorder and wish to acquire still images.

In summary, the choices available today to people interested in digital photography today are:

1) purchase a digital camera, 2) connect a video camera to a frame grabbing device attached to a computer or 3) purchase a digital camcorder with freeze frame capability.

The invention described here offers a fourth option which can be less expensive than purchasing a second camcorder or a digital camera and more practical that a connecting a video camera to a frame grabbing device.

BRIEF SUMMARY OF THE INVENTION

It is, therefore, an object of the present invention to provide a more economical way to acquire digital images. This is accomplished by eliminating all duplication of hardware. The proposed freeze frame adapter utilizes the optoelectronic transducer of the camcorder thus eliminating the most expensive element of the digital chain.

It is also an object of the present invention to provide a more practical way to acquire digital images. The freeze-frame adapter is designed as an add-on unit for camcorders. The unit is always on and ready for use whenever the camcorder is on. Still images can be acquired simultaneously to video. It is not a second device to carry and set up. It has the versatility of digital cameras without the extra cost. The unit does not depend on a computer to operate. It has the portability that is lacking in frame grabbers.

It is another object of the invention to improve the quality of the acquired digital images. The resolution of digital images is determined in great part by the quality of the optoelectronic transducer. Many camcorders have excellent transducers which can be fully utilized to generate digital images rather than purchasing an economical digital camera.

These and other objects and advantages will become apparent from a consideration of the ensuing description and accompanying drawings.

BRIEF DESCRIPTIONS OF THE DRAWINGS

FIG. 1 is a perspective view of the invention. (It illustrates how the freeze frame module [1] is connected to the camcorder at the battery attachment. The short cable [2] is the only other connection to the camcorder via the Audio-Video socket [3]. In the described embodiment the adapter module contains an output connector port [7] and the camcorder battery.); and FIG. 2 is a schematic perspective of the invention showing the adapter module [1] having electrical connectors for interfacing with mating connectors [5] in place. Images are acquired by pressing the shutter button [4].

DETAILED DESCRIPTION OF THE INVENTION

Figure 1:
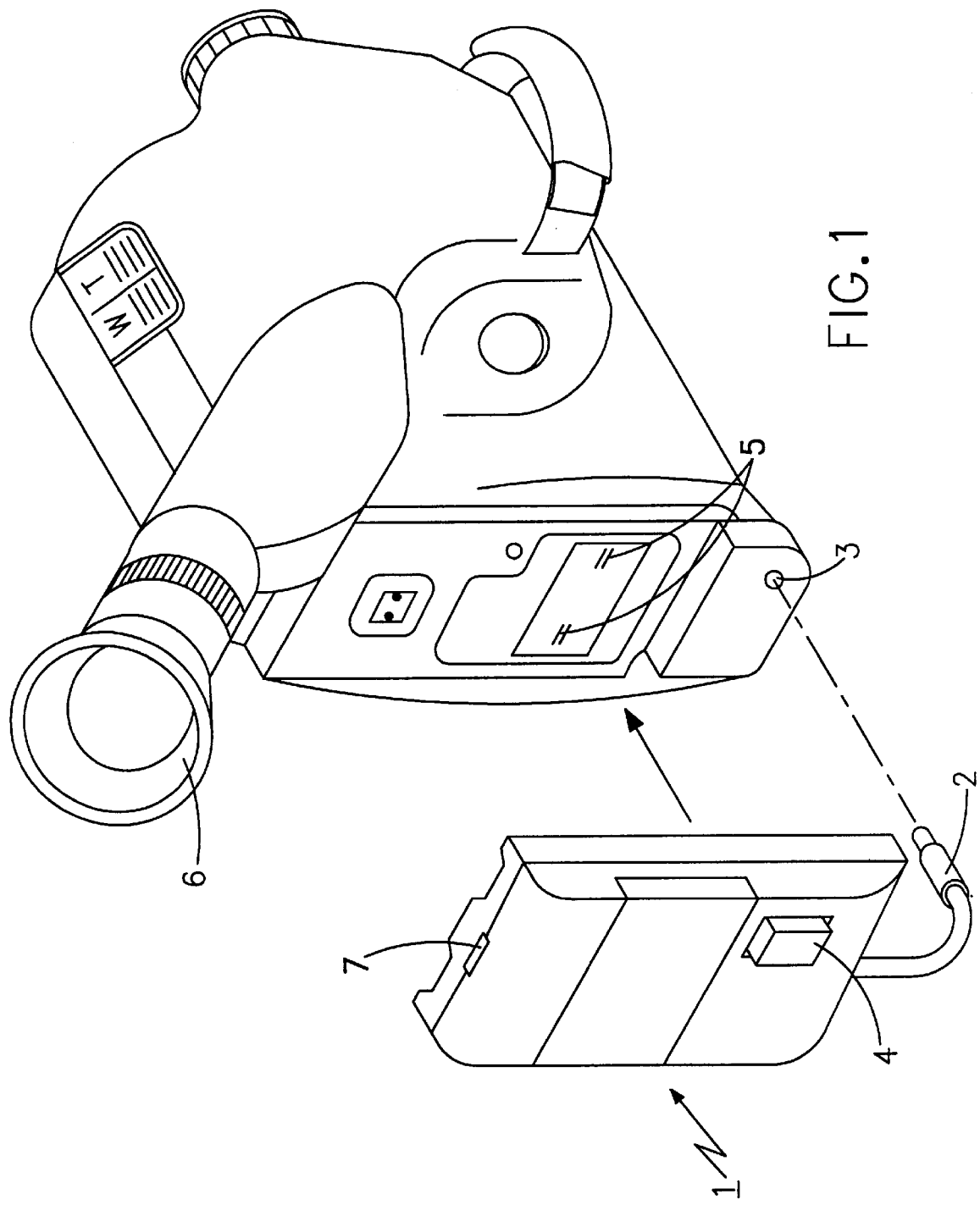
Figure 2:
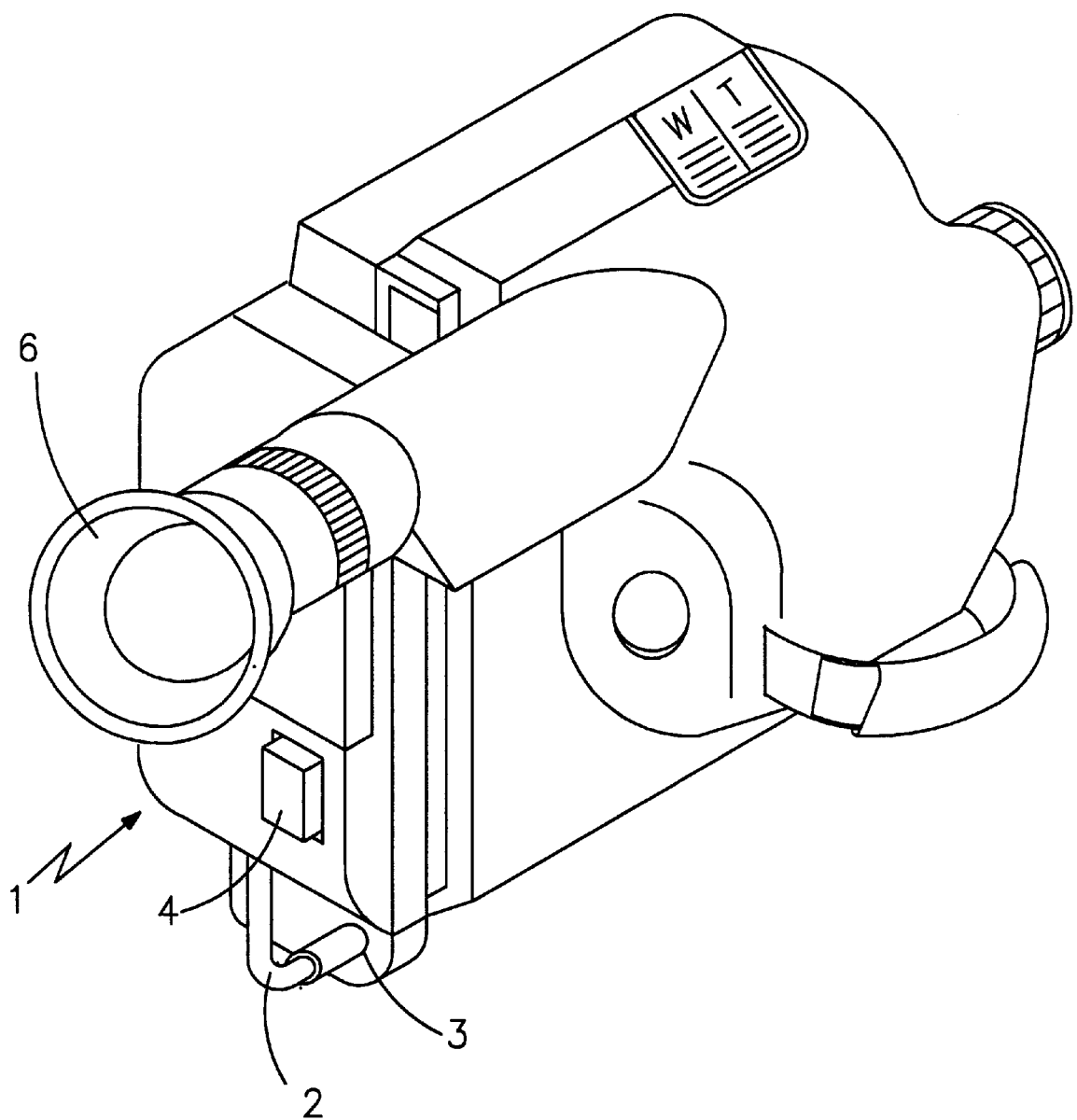

The embodiment of the invention presented here is construed as an add-on module which connects to the battery receptacle of the camcorder. No modifications of the camcorder or video camera are necessary. The module contains both the electronics and battery and replaces the battery of the camcorder. The battery provides power to both the camcorder and the photo adapter module. The snap-shot adapter is therefore not larger than the battery of the camcorder which it replaces. In an alternate embodiment the battery can be removable.

A short cable [2], connects the module to the Audio-Video output of the camcorder and derives the video signal used to capture the still images. The images are captured by pressing the shutter button [4].

Elements not specifically shown or described herein are understood to be selectable from those known in the art. The frame grabber circuitry is derived from standard electronics and therefore is not specifically described here. The same applies to the storage of images which can be realized with RAM, various magnetic storage media such as magnetic cards, disks, removable RAM, etc. The photo adapter module can be connected to an image processing system, such as computer/PC via serial or parallel ports, via infrared links or other data transfer links.

It should be appreciated that the embodiments have been illustrated for the purpose of illustration only, without any intention of limiting the scope of the present invention. Rather, it is the intention that the present invention be limited only by the appended claims.

The video signal used as source of images for the freeze-frame adapter is derived from the camcorder via the Audio-Video output, a standard feature of most camcorders.

The viewfinder of the camcorder also operates as the viewfinder in the snap-shot mode. The image is captured by pressing the shutter button [4]; and images can be acquired while the camcorder is filming. Both motion and still images of the same scene can be acquired by the system of the present invention. The camcorder and the freeze frame adaptor can be operated with a single hand as the shutter button [4] can be reached with the thumb of the same hand used to operate the video camera.

Accordingly, it can be seen that the photo adapter module represents an inexpensive and practical way to acquire still images from camcorders. Although the description above contains many specificities, these should not be construed as limiting the scope of the invention but as merely providing illustrations of some of the presently preferred embodiments of this invention. Various other embodiments and ramifications are possible within its scope. For example, an embodiment including separate or removable batteries is possible. Thus, the scope of the invention should be determined by the appended claims and their legal equivalents, rather than by the examples given.

What is claimed is:

1. A module for converting a video camera (camcorder) having a viewfinder, and an analog video output, as well as having a removable camcorder battery with electrical terminals for interfacing with mating connections on said video camera, to a camera with the additional capability of freeze framing at least one image/frame, said module comprising:

a housing having electrical connectors for interfacing with said mating connections (5) on said video camera, and having a connection input signal cable (2) for mating with said analog video output (3) of said video camera;

circuit means for capturing said at least one image/frame viewed by said viewfinder (6) of said video camera, and a memory for storing any said at least one image/frame captured by said circuit means selected from the group consisting of active memory modules, magnetic media, and optical media;

said module and said video camera being powered by a single power source selected from the group consisting of a removable/replaceable external battery electrically and mechanically connectable to said module, an internal battery similarly electrically connected to said module and being removable/replaceable;

an output port (7) on said module for connection to an image/processing system, a shutter button (4) for activating said circuit means; whereby when said shutter button is activated, said at least one image/frame viewed is stored in said memory for downloading into said image processing system upon connection of said module to said image processing system.

2. The module according to claim 1, wherein said connections on said video camera are replicated on an outer face of said module for connection with said removable camcorder battery of said video camera.

3. The module according to claim 1, further comprising means for displaying said image viewed selected from the group consisting of an external video monitor and a display built into said module.

4. The module according to claim 1, wherein said at least one image is a plurality of images.

5. The module according to claim 4, wherein said plurality of images are in an interrupted sequence so as to form a video sequence in digital format.

6. The module according to claim 5, further comprising circuitry for compressing said video sequence.

7. The module according to claim 5, wherein said memory comprises a CD-ROM for storing said video sequence.

8. The module according to claim 1, wherein said power source is at least one battery.

9. The module according to claim 8, wherein said power source is an external battery electrically and mechanically connected to said module.

10. The module according to claim 8, wherein said power source is an internal battery electrically connected to said module and being removable/replaceable.

11. The module according to claim 10, further including an external battery electrically and mechanically connectable to said module.

* * * * *